Patented Oct. 30, 1945

2,388,041

UNITED STATES PATENT OFFICE 2,388,041

PROCESS FOR THE EXTRACTION OF BUTADIENE

David Craig, Silver Lake, Ohio, assignor to The B. F. Goodrich Company, New York, N. Y., a corporation of New York No Drawing. Application July 26, 1941, Serial No. 404,206

2 Claims. (Cl. 202—41)

This invention relates to a process for preventing the polymerization of unsaturated compounds during their extraction from gases or liquids by means of organic solvents and during their subsequent recovery from said solvents.

In the separation or recovery of unsaturated hydrocarbons from mixtures containing such compounds, it is common practice to use a solvent in which such constituents are soluble for the extraction of these compounds. For example, butadiene, styrene, isobutylene, and cyclopentadiene are recovered from gas streams containing them by extraction with a solvent. This extraction may be performed by passing the gas stream counter-current to a stream of the solvent medium in a conventional stripper or scrubbing tower. Other organic solvents have also been effectively used for solvent extraction of aliphatic hydrocarbons and these solvents are well known to the prior art. The extraction may also be effected by means of a solvent such as methanol which may have a greater tendency to dissolve the impurities than the hydrocarbons.

Processes have also been developed by which hydrocarbons such as butadiene and isobutylene having boiling points close to each other have been separated by distillation in the presence of a selective solvent which is used because the difference in the boiling points of the hydrocarbon solutions is greater than the difference in the boiling points of the hydrocarbons.

Among known selective solvents may be mentioned those liquid organic compounds which contain at least one element selected from the group consisting of oxygen, nitrogen and the halogens. More particularly, those solvents have been found useful which possess high di-electric constants and which comprise one or more oxygen atoms in the molecule. Examples of such solvents are the glycol mono- and di-acetates, ethylene chlorhydrin, furfural and lactic acid nitrile. Aromatic bases such as aniline, toluidine or phenyl hydrazine have also been employed as solvents. Other solvents which are known to have definite selective solvent action on diolefins such as butadiene and isoprene are chlorex (bis beta-chloroethyl ether), dimethylformamide, and certain aldehydes and ketones such as butyraldehyde, methyl ethyl ketone, and acetone. Various aromatic solvents with active substituted groups such as nitrobenzene, chlorophenol, and phenol are also effective.

The solvents may conventionally be utilized alone or in admixture and the material to be extracted may be in liquid or vapor form. Where liquids are extracted organic solvents are usually selected which are immiscible therewith and permit the formation of two layers. When the extraction is performed on material in the gaseous state, the process is preferably performed by distilling the gaseous material counter-current to the liquid solvent in a fractionating column so that the gases freed from the unsaturates are drawn off at the top while the solution containing them accumulates at the bottom, although a similar operation may be performed in a simple scrubbing tower. In any case, the unsaturated materials are ordinarily recovered from the solvent containing them either by a reduction in pressure, an increase in temperature, or both.

In a conventional solvent extraction system as described above, conditions may exist which result in or favor the polymerization of these unsaturated compounds with the attendant losses in yield and deposition of polymers in the apparatus. The conjugated dienes are especially likely to undergo such reactions. This condition obviously is undesirable and gives rise to numerous operating difficulties as well as substantial losses in unsaturated compounds. The loss of even very small amounts of unsaturates through polymerization may become an important economic factor over a long period of time, while the delays caused by the necessity of removing the polymers formed may also be an important cost factor. This action may take place even at ordinary temperatures, and if the extraction of the unsaturates is carried out at elevated temperatures, the condition is aggravated. The iron oxides and sulfides frequently found in stills and extraction towers promote these reactions.

It is an object of the present invention to eliminate polymerization of unsaturated organic compounds during their extraction from gases or liquids by means of solvents.

A further object of the present invention is the prevention of losses of unsaturated compounds being recovered and the prevention of contamination of apparatus and solvents during the extracting operation.

Another object of the present invention is to provide an effective and desirable method for the solvent extraction of diolefins such as butadiene.

Other objects will be apparent from the following description:

This invention is based on the discovery that the presence of small quantities of materials which function as polymerization inhibitors or antioxidants will serve to prevent polymerization of the aforesaid unsaturates while they are being removed or extracted from the medium in which they are found or produced. The incorporation of the said materials in the system may take place prior to or during the contact of selective solvent with the unsaturated material. It is well known that the polymerization of unsaturated compounds frequently proceeds in a manner which points to an auto-catalytic effect; that is, the presence of some reaction product tends to promote further reaction at an accelerated rate. In view of this, it is obviously especially desirable to prevent the initial formation of such products by introducing the polymerization inhibitor before the solvent comes into contact with the unsaturates, thus preventing any appreciable accumulation of gum or polymer in the system.

For example, unsaturated hydrocarbons such as butadiene may be recovered from gas streams by the use of solvents such as saturated hydrocarbon oils obtained from naphthenic, aromatic, paraffinic or mixed base crude oils, decahydronaphthalene (decalin) or the other solvents well known for this purpose and referred to above. The inhibitor may be incorporated into the system by adding to these solvents a polymerization inhibitor such as a phenolic or arylamine compound of low volatility prior to or during their contact with the gases, and the extraction may then be performed in the usual way. Among such compounds are well-known antioxidants such as paraphenylene diamine, phenyl-beta-naphthylamine, beta naphthol, hydroquinone, phenyl-alpha-naphthylamine, and diphenyl paraphenylene diamine. Other inhibitors well known to the art as inhibiting polymerization such as copper stearate may be used. The amounts of antioxidants or inhibitor added may vary depending on the materials used and treated and on operating conditions and ordinarily need be only in minor proportion to the quantity of solvent. In general between about 0.1 and 1% of inhibitor based on weight of solvent will be satisfactory.

As a result of the aforesaid incorporation of the polymerization inhibitor in the solvent, the spontaneous polymerization of the unsaturates during their extraction and subsequent recovery and the consequent reduction in yield and deposition of polymerizates in the system is substantially eliminated and the continuous use of solvent made possible without accumulation of polymer. The following examples illustrate the manner in which the invention may be applied.

*Example I*

A petroleum distillate obtained from the products formed by vapor phase cracking of petroleum hydrocarbons and containing about 8% of diolefins, principally butadiene-1,3, may be scrubbed in an ordinary scrubbing tower filled with rings or similar material having a high surface area, by feeding the said distillate upwardly through the tower in vapor form in counter-current to a stream of a chilled wash oil such as a gas oil or a heavy liquid residuum rich in aromatic components. The wash oil may be chilled to a suitable temperature; i. e., about 0° C. Prior to its introduction into the tower the wash oil has had incorporated therewith a small quantity, say about 0.2%, of paraphenylene diamine as an antioxidant. The solvent oil is recovered at the bottom of the tower and the butadiene recovered therefrom by a gradual distillation. The denuded wash oil may be reused for another extraction.

If required small amounts of fresh antioxidant may be added to the denuded oil to replenish and maintain the antioxidant in proper proportion. After condensation a liquid containing about 30% of butadiene may be obtained. No substantial polymer formation could be noted on inspection of the equipment after operation for a period of weeks. The solvent was also substantially free from polymer.

An identical procedure carried out on another portion of the same starting material for the same period of time leaving out the antioxidant, resulted in appreciable polymer formation sufficient to require cleaning of the apparatus and a distillation purification of the solvent.

*Example II*

A mixture containing 50% butadiene along with a substantial proportion of isobutylene and other butenes as impurities may be fed at the center of a sixty plate bubble cap column and 95% acetone containing about 0.1% hydroquinone is supplied at the top of the column in quantities ten times the weight of the feed. The liquid flowing from the bottom of the column is heated to boil out the purified butadiene and is recirculated, while a portion of the butadiene vapor is returned to the bottom of the column to maintain the saturation of the descending solvent. The remainder of the butadiene recovered from the solvent is condensed and removed as the product. In this manner the butadiene is easily enriched to 95% concentration. On inspection of the apparatus, substantially no gum or polymer formation is detected. This is apparently due to the incorporation of the inhibitor, since a similar run under ordinary conditions without the inhibitor results in noticeable gum or polymer formation, particularly after continued operation.

*Example III*

A mixture containing about equal parts by weight of butadiene, sulfur dioxide, and methanol was placed, together with phenyl-beta-naphthylamine, in a kettle connected to a thirty plate bubble cap column. A solvent consisting of an 0.8% solution of phenyl-beta-naphthylamine in methanol was introduced at the top of the column and allowed to run counter-current to the ascending vapors. A reflux ratio varying from 10:1 at the beginning to 15:1 at the end of the extraction was employed. The distillate was free from sulfur dioxide until over 98% of the butadiene had been collected. No visible polymerization occurred in the column, although when similar distillations are performed in the absence of an antioxidant, the column must be cleaned at the end of or during each run. Polymerization in the kettle was substantially reduced by the presence of the phenyl-beta-naphthylamine.

*Example IV*

To a selective solvent consisting of a 28% solution of sulfur dioxide in methyl ethyl ketone was added 0.25% of phenyl-beta-naphthylamine. About four parts by weight of this solvent were added to one part of a mixture of approximately equal parts of butadiene and C₄-monoolefins in a kettle connected to a thirty plate bubble cap column. The distillation was started, and an additional portion of the selective solvent was introduced at the top of the column and allowed to run counter-current to the ascending vapors. The effluent vapors which were collected at the top of the column contained less than 2% of butadiene. As long as there was an antioxidant present in the solvent used as a reflux, no polymerization was observed in the column. When the solvent was replaced by pure methyl ethyl ketone, however, a layer of polymer formed on the inside surfaces and caps of the column within half an hour.

I claim:

1. A process for separating butadiene from a mixture of butadiene and isobutylene while preventing the formation of polymeric material, which comprises distilling said mixture upward through a fractionating column down which flows a stream of a solution of sulfur dioxide in acetone containing about 0.1 to 1% by weight of dissolved phenyl-beta-naphthylamine, and recovering enriched butadiene from the said solution.

2. A process for separating butadiene from a mixture of butadiene and butylenes while preventing the formation of polymeric material, which comprises distilling said mixture upward through a fractionating column down which flows a stream of a solution of sulfur dioxide in methyl ethyl ketone containing about 0.1 to 1% by weight of dissolved phenyl-beta-naphthylamine, and recovering enriched butadiene from the said solution.

DAVID CRAIG.